United States Patent [19]

Aonuma et al.

[11] Patent Number: 4,617,234

[45] Date of Patent: Oct. 14, 1986

[54] MAGNETIC RECORDING MEDIUM

[75] Inventors: Masashi Aonuma; Yasuo Tamai, both of Kanagawa, Japan

[73] Assignee: Fuji Photo Film Co., Ltd., Kanagawa, Japan

[21] Appl. No.: 673,318

[22] Filed: Nov. 20, 1984

[30] Foreign Application Priority Data

Nov. 21, 1983 [JP]  Japan .................................. 58-219108

[51] Int. Cl.$^4$ ........................... G03C 7/24; G11B 5/70; H01F 10/02
[52] U.S. Cl. .................................... 428/328; 428/900; 428/694; 252/62.54
[58] Field of Search ....................... 428/900, 694, 328; 427/127, 128; 252/62.54

[56] References Cited

U.S. PATENT DOCUMENTS

| | | | |
|---|---|---|---|
| 4,207,092 | 6/1980 | Berry ............................... | 428/128 X |
| 4,302,523 | 11/1981 | Audran et al. .................... | 428/328 X |
| 4,396,668 | 8/1983 | Saito et al. ....................... | 428/328 X |
| 4,410,590 | 10/1983 | Kawahara et al. ............... | 428/900 X |
| 4,439,486 | 3/1984 | Yamada et al. ................... | 428/900 X |
| 4,444,835 | 4/1984 | Togawa et al. ................... | 428/328 X |
| 4,455,345 | 6/1984 | Miyatuka et al. ................ | 428/900 X |
| 4,480,004 | 10/1984 | Togawa et al. ................... | 428/328 X |
| 4,500,599 | 2/1985 | Ogawa et al. .................... | 252/65.54 X |
| 4,537,833 | 8/1985 | Kasuqa et al. ................... | 428/900 X |
| 4,555,431 | 11/1985 | Miyatsuka ....................... | 428/900 X |

FOREIGN PATENT DOCUMENTS

| | | | |
|---|---|---|---|
| 0046326 | 3/1982 | Japan ............................... | 252/62.54 |
| 0069711 | 4/1982 | Japan ............................... | 252/62.54 |

*Primary Examiner*—Nancy A. B. Swisher
*Attorney, Agent, or Firm*—Sughrue, Mion, Zinn, Macpeak and Seas

[57] ABSTRACT

An improved magnetic recording medium comprising a magnetic layer formed by applying a ferromagnetic metal powder together with a binder to a non-magnetic base is described. The improvement is that the ferromagnetic metal powder has a saturation magnetism of 120 to 140 emu/g and a specific surface area measured by the BET method of 23 to 35 m/g, and the magnetic layer has a coercive force of 670 to 770 oersteds and a residual magnetic flux density of about 2,000 to 3,200 gauss. The magnetic recording medium is suitable for cassette tapes used in a high position and has excellent reproductive output in the whole band while keeping noise low.

12 Claims, No Drawings

MAGNETIC RECORDING MEDIUM

FIELD OF THE INVENTION

The present invention relates to a magnetic recording medium and, particularly, to a magnetic recording medium which is suitable for cassette tapes used in high position and has excellent reproduction output in the whole band while keeping noise low.

BACKGROUND OF THE INVENTION

Magnetic recording media and, particularly, audio compact cassette tapes (hereinafter, referred to as cassette tapes) are made so as to have high performance year by year. Improvement of sensitivity and frequency characteristic, improvement of MOL and SOL and improvement of dynamic range by making noise low have been made. With respect to the position of the cassette tapes, development of tapes for normal position so as to be used in high position and, further, in metal position has occurred.

Hitherto, in audio cassette tapes for high position, chromium dioxide and Co coated or doped magnetic iron oxide were used as magnetic materials. Further, as layer construction, tapes having a monolayer or multilayer construction were used. With respect to tape characteristics for high position, tapes having a coercive force (Hc) of 560 to 680 oersteds and a residual magnetic flux density of 1400 to 1900 gauss were much studied.

In recent years, ferromagnetic metal powders having larger magnetic moments than the prior magnetic materials have been studied (for example, Japanese patent application (OPI) 64629/83). (The term "OPI" as used herein refers to a "published unexamined Japanese patent application".)

However, there are problems that the frequency characteristic balance in high position is not sufficient, output in a low band is inferior, a squareness ratio is small and demagnetization is large.

SUMMARY OF THE INVENTION

As a result of extensive studies concerning the characteristics of a ferromagnetic metal powder and a magnetic layer, it has been found that the above described problems can be remarkably overcome by using a ferromagnetic metal powder having a specified saturation magnetization and a specified BET specific surface area and by providing a magnetic layer having a specified coercive force and a specified residual magnetic flux density. Thus, the present invention has been attained.

Accordingly, a first object of the present invention is to provide a maganetic recording medium which has an excellent reproduction output in the whole band with the same bias as that of conventional iron oxide in high position and a sufficient frequency characteristic balance.

A second object is to provide a magnetic recording medium having a large squareness ratio and low demagnetization.

The above described objects of the present invention are attained by providing a magnetic recroding medium comprising a magnetic layer formed by applying a ferromagnetic metal powder together with a binder to a non-magnetic base, wherein the ferromagnetic metal powder has a saturation magnetization ($\sigma s$) of 120 to 140 emu/g and a specific surface area measured by a BET method of 23 to 35 m$^2$/g, and the magentic layer has a coercive force (Hc) of 670 to 770 oersteds (Oe) and a residual magnetic flux density (Br) of about 2000 to 3200 gauss.

DETAILED DESCRIPTION OF THE INVENTION

Saturation magnetization (hereinafter, referred to as $\sigma s$) of the ferromagnetic metal powder used in the present invention is in the range of 120 to 140 emu/g and, preferably, 125 to 135 emu/g. If $\sigma s$ is more than 140 emu/g, the weatherproofing property of the ferromagnetic metal powder deteriorates, and deterioration of stability with the passage of time, deterioration of bias noise and loss of frequency characteristic balance occur when a magnetic tape is made. On the other hand, if $\sigma s$ is less than 120 emu/g, characteristics of the ferromagnetic metal powder are lost and reduction of sensitivity and loss of frequency characteristic balance occur. The specific surface area of the ferromagnetic metal powder measured by a BET method is in the range of 23 to 35 m$^2$/g, preferabley, 25 to 35 m$^2$/g. If it is more than 35 m$^2$/g, the weatherproofing property of the ferromagnetic powder deteriorates, and deterioration of stability with the passage of time, reduction of squareness ratio and loss of frequency characteristic balance occur when a tape is made. On the other hand, if the specific surface area is less than 23 m$^2$/g, bias noise becomes very high and dynamic range becomes narrow, when a tape is made.

Coercive force (hereinafter, referred to as Hc) of the magnetic recording medium is in the range of 670 to 770 Oe, and preferably 680 to 750 Oe. If Hc is more than 770 Oe, the bias in high position becomes very deep and sensitivity in the low band and MOL are reduced causing loss of frequency characteristic balance.

On the other hand, if Hc is less than 670 Oe, the sensitivity in the low band and MOL becomes so high as to cause loss of frequency characteristic balance.

Residual magnetic flux density (hereinafter, referred to as Br) is important for keeping the balance of frequency characteristics together with the Hc. If the Br is more than 3200 gauss, output in the low band becomes high and frequency characteristic balance is lost and bias noise becomes high at the same time. On the other hand, if the Br is less than 2000 gauss, output in the low band deteriorates and frequency characteristic balance is lost.

The ratio of the Br to the Hc, i.e., Br/Hc is preferably in the range of about 3 to 4.2, and the squareness ratio, i.e., Br/Bm, preferably in the range of not less than 0.80, and more preferably not less than 0.82.

As described above, the $\sigma s$ and the specific surface area of the ferromagnetic metal powder used are important and balance of the Hc to the Br of the magnetic layer is important in order to greatly improve the reproduction output in the whole band while keeping noise at a low level, namely, in order to have a high MOL and a high SOL and to retain the frequency characteristic balance, which are the objects of the present invention.

In the present invention, the surface property of the magnetic layer is important in addition to the above described characteristics. In the case that the surface property is indicated as surface luster, it is effective that the surface luster in the logitudinal direction of the tape in the width of the cassette determined according to JIS K7105 and JIS Z8741 be about 50 or more and, preferably, 80 or more.

If the surface luster is less than 50, it is difficult to greatly improve reproduction output in the whole band of the present invention even though the magnetic tape has the above described magnetic characteristics.

The thickness of the magnetic layer in the present invention is in the range of about 2.5 to 5.5$\mu$ and, preferably, in the range of 3 to 4.5$\mu$.

As the ferromagnetic metal powder in the present invention, materials known hitherto can be used, wherein about 75% by weight or more, preferably, 80% by weight or more, thereof is a metal component and 50% or less of said metal component is Fe, which can contain one or more metals selected from Co, Ni, Cr, Zn, Al and Mn, etc. (As described in, for example, Japanese patent application (OPI) 56508/77 corresponding to U.S. Pat. No. 4,246,316). Besides the metal coponent, H, O and N, etc. may be present. Materials having an average particle size in the short axis direction of about 150 to 500 Å and, preferably, 250 to 450 Å and an axis ratio of about 3 to 20 are used.

The $\sigma$s of the ferromagnetic metal powder is controlled by the composition of the powder and the surface treatment after reduction.

The surface treatment is carried out by processing with, for example, air, oxygen, nitrogen, ammonia gas or various oxidizing agents.

On the other hand, the specific surface area of the ferromagnetic metal powder is controlled by the specific surface area of the starting materials, namely, by selecting the length and the axis ratio of particles and shape thereof, etc. for example, obtaining a ferromagnetic metal powder by hydrogen reduction processing using goethite or needle-like iron oxide.

The mixing rate of the ferromagnetic metal powder and the binder used in the present invention is in the ragne of about 10 to 400 parts by weight, preferably, 15 to 50 parts by weight of the binder based on 100 parts by weight of the ferromagnetic metal powder.

As the binder used in the present invention, there are known thermoplastic resins, thermosetting resins and reactive resins, or mixtures thereof.

As the thermoplastic resins, those having a softening point of about 150° C. or more, an average moleculer weight of about 10,000 to 20,000 and a degree of polymerization of about 200 to 500 are used, for example, vinyl chloride-vinyl acetate copolymer, vinyl chloride-vinylidene chloride copolymer, vinyl chloride-acrylonitrile copolymer, acrylic acid ester-acrylonitrile copolymer, acrylic acid ester-vinylidene chloride copolymer, acrylic acid ester-styrene copolymer, methacrylic acid ester-acrylonitrile copolymer, methacrylic acid ester-vinylidene chloride copolymer, methacrylic acid ester-styrene copolymer, urethane elastomer, nylon-silicone type resin, nitro-cellulose-polyamide resin, polyvinyl fluoride, vinylidene chloride-acrylonitrile copolymer, butadiene-acrylonitrile copolymer, polyamide resin, polyvinyl butyral, cellulose derivatives (cellulose acetate butyrate, cellulose diacetate, cellulose triacetate, cellulose propionate, etc.) styrene-butadiene copolymer, polyester resin, chlorovinyl ether-acrylic acid ester copolymer, amino resin, various synthetic rubber type thermoplastic resins and mixtures thereof.

As the thermosetting resins and the reactive resins, there are those which have a molecular weight of less than 200,000 as a coating solution, but the molecular weight beomes infinity by reactions such as condensation or addition, etc. when heated after application and drying. Of these resins, those which do not soften or fuse before thermal decomposition of the resins are preferred. Examples of the thermosetting and reactive resins include phenol resin, epoxy resin, polyurethane setting resin, urea resin, melamine resin, alkyd resin, silicone resin, acryl based reactive resin, epoxypolyamide resin, nitrocellulose-melamine resin, mixtures of high moleclar weight polyester resin and isocyanate prepolymer, mixtures of methacrylate copolymer and diisocyanate prepolymer, mixtures of polyester polyol and polyisocyanate, urea-formaldehyde resin, mixtures of low molecular weight glycol/high molecular weight diol/triphenylmethane triisocyanate, polyamine resin, and mixtures thereof.

Examples of these resins have been described in U.S. Pat. No. 4,135,016.

To the magnetic layer, dispersing agents, lubricants, abrasives, antistatic agents and anticorrosive agents etc. are added as additives in addition to the above described ferromagnetic powder and the binder.

As the dispersing agents added to the magnetic layer, there are aliphatic acids having 12 to 18 carbon atoms ($R_1COOH$, wherein $R_1$ is an alkyl group having 11 to 17 carbon atoms) such as caprylic acid, capric acid, lauric acid, myristic acid, palmitic acid, stearic acid, oleic acid, elaidic acid, linolic acid, linolenic acic or stearolic acid, etc.; metal soaps composed of alkali metal (Li, Na, K etc.) or alkaline earth metal (Mg, Ca, Ba) salts of the above described aliphatic acids; and lecithin, etc. In addition, higher alcohols having 12 or more carbon atoms and sulfuric acid esters of the alcohols can be used. These dispersing agents are added in the range of about 1 to 20 parts by weight based on 100 parts by weight of the binder.

As the lubricants added to the magnetic layer, it is possible to use silicone oil, carbon black graft polymer, molybdenum disulfide, tugsten disulfide, aliphatic acid esters composed of monobasic aliphatic acid having 12 to 16 carbon atoms and monohydric alcohol having 3 to 12 carbon atoms, and aliphatic acid esters composed of aliphatic acid having 17 or more carbon atoms and alcohol in which the total number of carbon atoms is 21 to 23. These lubricants are added in the range of about 0.2 to 20 parts by weight based on 100 parts by weight of the ferromagnetic metal powder. They have been described in U.S. Pat. No. 4,135,016, etc.

As the abrasives, substances conventionally used, such as fused alumina, silicon carbide, chromium oxide, corundum, $TiO_x$ ($x=1.0$ to 1.9), artificial corundum, diamond, artificial diamond, garnet or emery (main components: corundum and magnetite), etc. are used. These abrasives used have an average particle size of about 0.05 to 5$\mu$ and, preferably, 0.1 to 2$\mu$. These abrasives are added in the range of about 0.1 to 20 parts by weight based on 100 parts by weight of the ferromagnetic metal powder. They have been described in U.S. Pat. No. 4,135,016, etc.

As the antistatic agents, natural surface active agents such as saponin, etc.; nonionic surface active agents such as alkylene oxide type, glycerol type or glycidol type agents, etc.; cationic surface active agents such as higher alkylamines, quaternary ammonium salts, pyridine and other heterocycles, phosphonium or sulfoniums, etc.; anionic surface active agents containing acid groups such as carboxylic acid, sulfonic acid, phosphoric acid, sulfuric acid ester or phosphoric acid ester group, etc.; and ampholytic surface active agents such as amino acids, aminosulfonic acids, or sulfuric or phosphoric acid esters or aminoalcohols, etc. can be used.

These surface active agents may be added alone or as a mixture. Although they are used as antistatic agents, they sometimes are used for other purposes, for example, for improvement of dispersion, magnetic characteristics, or slipping properties or as coating aids.

Formation of the magnetic layer is carried out by dissolving the components in an organic solvent and applying the resulting coating solution to a non-magnetic base.

The ferromagnetic metal powder and the above described binders, dispersing agents, lubricants, abrasives, antistatic agents and solvents, etc. are kneaded to make a magnetic coating.

In carrying out kneading, the ferromagnetic metal powder and each of the above described components are thrown into a kneader at the same time or in turns. For example, there is a method which comprises adding the ferromagnetic metal powder to a solvent containing a dispersing agent, kneading for a prescribed time, and thereafter adding the residual of each component thereto and continuing kneading to obtain a magnetic coating.

In order to carry out kneading and dispersing, various kinds of kneaders can be used. Examples of the kneaders include a two-rod roll mill, a three-rod roll mill, a ball mill, a pebble mill, a trommel, a sand grinder, a Szegvari attritor, a high-speed impeller disperser, a high-speed stone mill, a high-speed impact mill, a disperser, a kneader, a high-speed mixer, a homogenizer or an ultrasonic disperser, etc.

Techniques concerning kneading and dispersing have been described in "Paint Flow and Pigment Dispersion" written by T. C. Patton (issued by John Wiley & Sons Co., 1964). Techniques have been also described in U.S. Pat. Nos. 2,581,414 and 2,855,156.

As methods of applying the above described magnetic recording layer to a base, an air doctor coating method, a plate coating method, an air-knife coating method, a squeeze coating method, an immersion coating method, a reverse roll coating method, a transfer roll coating method, a gravure coating method, a kiss coating method, a cast coating method and a spray coating method, etc. can be utilized, and other methods can be used. They have been described in detail in "Coating Kogaku" pages 253-277 issued by Asakura Shoten (Mar. 20, 1971).

As organic solvents used to apply the magnetic recording layer there are ketone type solvents such as acetone, methyl ethyl ketone, methyl isobutyl ketone or cyclohexanone, etc., alcohol type solvents such as methanol, ethanol, propanol or butanol, etc., ester type solvents such as methyl acetate, ethyl acetate, butyl acetate, ethyl lactate or glycol acetate monoethyl ether, etc., glycol ether type solvents such as ether, glycol dimethyl ether, glycol monoethyl ether or dioxane, etc., tar type solvents (aromatic hydrocarbons) such as benzene, toluene or xylene, etc., and chlorinated hydrocarbons such as methylene chloride, ethylene chloride, carbon tetrachloride, chloroform, ethylene chlorohydrin or dichlorobenzene, etc.

The magnetic layer applied to a base by such a method is dried after being subjected to, if necessary, processing for orientation of the ferromagnetic metal powder in the layer.

In this case, the orientation magnetic field is about 500 to 5000 Oe at alternating current or direct current, the drying temperature is about 50° to 120° C., and the drying time is about 0.5 to 10 minutes.

Further, if necessary, it is subjected to surface smoothing processing or cutting into a desired shape to produce a magnetic recording medium of the present invention.

In the following, the present invention is illustrated in greater detail with reference to examples which are not meant to be limiting.

Unless otherwise indicated, all ratios, percentages, etc. are by weight.

EXAMPLE AND COMPARATIVE EXAMPLE A

Various kinds of geothite having a specified specific surface area in which nickel was adsorbed were subjected to thermal processing at 600° to 750° C. to obtain Fe-Ni type needle oxide. They were then subjected to hydrogen reduction processing at 300° to 400° C. to obtain Fe-Ni type ferromagnetic metal powders. They were then immersed in toluene and taken out in the air, and toluene was evaporated to obtain various kinds of dried Fe-Ni type ferromagnetic metal powder having a specified specific surface area and $\sigma s$. Results are shown in Table 1.

Using these various ferromagnetic metal powders, magnetic coatings having the following composition were prepared.

| | |
|---|---|
| Feromagnetic metal powder (characteristics are shown in Table 1) | 100 parts by weight |
| Vinyl chloride/vinyl acetate/vinyl alcohol copolymer (91/3/6% by weight) | 10 parts by weight |
| Polyester polyurethane (molecular weight: about 130,000) | 6 parts by weight |
| Carbon black (average particle size: 20 m$\mu$) | 1 part by weight |
| Oleic acid | 2 parts by weight |
| $\alpha$-Al$_2$O$_3$ (average particle size: 0.4$\mu$) | 3 parts by weight |
| Methyl ethyl ketone | 150 parts by weight |
| Cyclohexanone | 150 parts by weight |

The above described composition was put in a ball mill and kneaded for 5 hours. Thereafter, it was further dispersed in a sand grinder for 1 hour. 4 Parts by weight of triisocyanate compound (trade name: "Coronate" manufactured by Nippon Polyurethane Co.) were added thereto, and the mixture was dispersed under high-speed shear for 30 minutes to obtain magnetic coatings.

Each of the above described magnetic coatings was applied to a side of a polyethylene terephthalate film having a thickness of 7.5$\mu$ (Ra about 0.05$\mu$), and heated to dry with applying a magnetic field of about 3,500 Oe. The resulting magnetic web was subjected to calendering and slitted so as to have a width of 3.8 mm to obtain cassette tapes for audio-cassettes.

B-H characteristics and magnetic properties of the resulting cassette tape sample No. T-1 to T-9 are shown in Table 2.

Then, the cassette tape samples No. T-1 to T-9 were allowed to stand for 7 days at 60° C. and 90% RH, and thereafter the residual magnetic flux density and surface luster of the resulting tapes were measured. Results obtined are shown in Table 3.

COMPARATIVE EXAMPLE B

Using a ferromagnetic metal powder: Sample No. 5 used in the Example, a cassette tape was obtained according to the process shown in the Example. However, the dispersing process in the sand grinder was abridged. Coercive force (Hc) of the resulting tape was 730 Oe, residual magnetic flux density (Br) was 2600 Gauss, and squareness ratio was 0.81. The thickness of the magnetic layer was 3.5μ, and surface luster was 47%. Magnetic properties were as follows. namely, 315 Hz sensitivity was −1.2 dB, frequency characteristic was −0.4 dB, MOL was +2.0 dB, SOL was +1.4 dB, and bias noise was −0.4 dB and +2.1 dB in a total dynamic range.

TABLE 1

| Ferromagnetic Metal Powder Sample No. | BET Specific Surface Area ($m^2/g$) | Saturation Magnetization ($\sigma s$) (emu/g) | Tape Sample No. |
| --- | --- | --- | --- |
| 1 | 23 | 158 | T-6 |
| 2 | 23 | 138 | T-1 |
| 3 | 25 | 135 | T-2 |
| 4 | 28 | 149 | T-7 |
| 5 | 28 | 128 | T-3 |
| 6 | 31 | 130 | T-4 |
| 7 | 31 | 114 | T-8 |
| 8 | 34 | 130 | T-5 |
| 9 | 37 | 136 | T-9 |

TABLE 2-1

| | B-H Characteristics | | | | |
| Tape Sample No. | Coercive Force (Hc) (Oe) | Residual Magnetic Field Density (Br) (gauss) | Squareness Ratio (Br/Bm) | Surface Luster (%) | Thickness of Magnetic Layer (μm) |
| --- | --- | --- | --- | --- | --- |
| Example | | | | | |
| T-1 | 700 | 2940 | 0.86 | 100 | 3.6 |
| T-2 | 700 | 2900 | 0.85 | 105 | 3.5 |
| T-3 | 720 | 2800 | 0.84 | 110 | 3.5 |
| T-4 | 730 | 2740 | 0.82 | 110 | 3.5 |
| T-5 | 740 | 2550 | 0.82 | 120 | 3.6 |
| Comparative Example A | | | | | |
| T-6 | 690 | 3450 | 0.87 | 105 | 3.5 |
| T-7 | 710 | 3240 | 0.84 | 110 | 3.6 |
| T-8 | 740 | 2200 | 0.82 | 115 | 3.5 |
| T-9 | 740 | 2700 | 0.80 | 120 | 3.5 |

TABLE 2-2

| Measurement magnetic field Hm = 2K Oe Magnetic Properties | | | | | |
| 315 Hz Sensitivity (dB) | Frequency Characteristic 10 KHz (dB) | MOL 315 Hz (dB) | SOL 10 Hz (dB) | Bias Noise (dB) | Total Dynamic Range (dB) |
| --- | --- | --- | --- | --- | --- |
| +2.5 | −0.8 | +3.8 | +3.5 | +0.5 | +3.2 |
| +2.2 | −0.2 | +3.5 | +3.4 | +0.1 | +3.4 |
| +1.9 | 0.0 | +3.2 | +3.3 | −0.1 | +3.4 |
| +1.8 | +0.2 | +3.1 | +3.5 | −0.3 | +3.6 |
| +1.6 | +0.8 | +3.0 | +4.2 | −0.5 | +4.1 |
| +3.5 | −2.0 | +4.8 | +2.5 | +1.4 | +2.3 |
| +3.1 | −1.3 | +4.1 | +2.7 | +1.0 | +2.4 |
| +0.9 | +1.5 | +1.9 | +3.9 | −0.5 | +3.4 |
| +1.5 | +1.4 | +2.6 | +4.7 | −0.9 | +4.6 |

TABLE 3

| Tape Sample No. | Br' (gauss) | Δ Br (%) | Surface Luster (%) |
| --- | --- | --- | --- |
| Example | | | |
| 1 | 2860 | 2.7 | 95 |
| 2 | 2830 | 2.4 | 100 |
| 3 | 2730 | 2.5 | 103 |
| 4 | 2640 | 3.6 | 100 |
| 5 | 2440 | 4.3 | 105 |
| Comparative Example A | | | |
| 6 | 3200 | 7.2 | 90 |
| 7 | 3010 | 7.1 | 90 |
| 8 | 2150 | 2.7 | 102 |
| 9 | 2400 | 11.1 | 78 |

Methods of measuring values shown in Tables 1–3 are illustrated in the folowing.

(a) Saturation Magnetization

Saturation magnetization is the value measured in the measurement of magnetic field Hm=10K Oe.

(b) Coercive Force

Coercive force is the value measured in the measurement of magnetic field Hm=2K Oe.

(c) Squareness Ratio

Squareness ratio is a value measured in the measurement of magnetic field Hm=2K Oe.

(d) Surface Luster

Surface luster is the value measured at an angle of 45° using a cassette type digital glossmeter GK-45D manufactured by Suga Shikenki Co., Ltd.

(e) Magnetic Properties

Nakamichi 582 was used as a measurement deck (high position).

0 dB in Table 2 is the value of a cassette tape FR-II for high position produced by Fuji Photo Film Co., Ltd.

MOL is the maximum output level when the distortion factor becomes 3%. SOL is the saturation output level of 10 KHz. Bias noise is the an output level after passing a weighting network. Total dynamic range is represented by ((315 HzMOL+10 KHzSOL)/2-bias noise).

(f) Br'

Br' is the residul magnetic flux density after preserved at 60° C. and 90% RH for 7 days.

(g) ΔBr

ΔBr means demagnetization and is represented by the following formula $$\Delta Br = \left(1 - \frac{Br'}{Br}\right) \times 100$$

It is understood from the results shown in Table 2 that, in examples of the present invention (Sample Nos. T-1 to T-5), the objects of the present invention are attained, namely, frequency characteristic balance is kept within ±1 dB based on an available iron oxide tape (FR-II), both MOL and SOL are +3 dB or more, and total dynamic range is +3 dB or more. On the other hand, in the comparative examples (Sample Nos. T-6 to T-9), frequency characteristic balance is inferior (−1 dB or +1 dB). In Sample Nos. T-6 and T-7, frequency characteristic is less than −1 dB and balance is inferior. Although MOL is high, SOL is less than +3 dB, and bias noise is more than +1 dB, and +3 dB in total dynamic range is difficult to obtain.

In Sample Nos. T-8 and T-9, the frequency characteristic is more than +1 dB and the MOL is less than +3 dB. Particularly, in Sample No. T-8, the MOL is less improved.

It is understood from the results shown in Table 3 that the tape samples T-1 to T-5 of the examples have stabilized values, wherein lowering of Br and deterioration of Br and luster are small. On the other hand, the tape sample T-9 of Comparative Example A has a problem in reliance of the magnetic recording medium, because deterioration of Br and luster is remarkable.

Further, it is understood from the results of Comparative example B that the effect of the present invention is not sufficiently obtained when dispersion by the sand grinder is insufficient and surface luster is poor.

While the invention has been described in detail and with reference to specific embodiment thereof, it will be apparent to one skilled in the art that various changes and modifications can be made therein without departing from the spirit and scope thereof.

What is claimed is:

1. An audio cassette tape magnetic recording medium used in the high position comprising a magnetic layer formed by applying a ferromagnetic metal powder together with a binder to a non-magnetic base, wherein said ferromagnetic metal powder has a saturation magnetization ($\sigma s$) of 120 to 140 emu/g and a specific surface area measured by the BET method of 23 to 35 m$^2$/g, and said magnetic layer has a coercive force (Hc) of 670 to 770 oersteds (Oe) and a residual magnetic flux density (Br) of about 2000 to 3200 Gauss, wherein the ratio of the residual magnetic flux density to the coercive force is in a range of about 3 to 4.2.

2. The magnetic recording medium of claim 1, wherein the ferromagnetic metal powder has a saturation magnetization ($\sigma s$) of 125 to 135 emu/g.

3. The magnetic recording medium of claim 1, wherein the ferromagnetic metal powder has a specific surface area measured by the BET method of 25 to 35 m$^2$/g.

4. The magnetic recording medium of claim 1, wherein the magnetic layer has a coercive force of 680 to 750 Oe.

5. The magnetic recording medium of claim 1, wherein the medium has a squareness ratio of not less than about 0.80.

6. The magnetic recording medium of claim 5, wherein the medium has a squareness ratio of not less than 0.82.

7. The magnetic recording medium of claim 1, wherein the surface luster in the longitudinal direction of a tape in the width of the cassette is 50 or more.

8. The magnetic recording medium of claim 5, wherein the surface luster in the longitudinal direction of a tape in the width of a cassette is 80 or more.

9. The magnetic recording medium of claim 1, wherein the ferromagnetic metal powder has a saturation magnetization ($\sigma s$) of 125 to 135 emu/g, the ferromagnetic metal powder has a specific surface area measured by the BET method of 25 to 35 m$^2$/g, the magnetic layer has a coercive force of 680 to 750 Oe, the ratio of the residual magnetic flux density to the coercive force is in a range of about 3 to 4.2 and the medium has a squareness ratio of not less than about 0.80.

10. The magnetic recording medium of claim 9, wherein the medium has a squareness ratio of not less than 0.82.

11. The magnetic recording medium of claim 10, wherein the surface luster in the longitudinal direction of a tape in the width of the cassette is 50 or more.

12. The magnetic recording medium of claim 11, wherein the surface luster in the longitudinal direcion of a tape in the width of a cassette is 80 or more.

* * * * *